United States Patent [19]

Wright et al.

[11] 3,721,532

[45] March 20, 1973

[54] AMMONIA SYNTHESIS SYSTEM

[75] Inventors: Lee E. Wright, West Covina; Allan E. Pickford, Palos Verdes Estates, both of Calif.

[73] Assignee: C. F. Braun & Co., Alhambra, Calif.

[22] Filed: Feb. 8, 1971

[21] Appl. No.: 113,333

[52] U.S. Cl..................23/289, 23/260, 23/288 H, 23/288 K, 23/288 R, 165/67, 165/83, 165/158, 165/176, 423/361
[51] Int. Cl............B01j 9/04, C01c 1/04, F28d 7/06
[58] Field of Search.....23/289, 288 R, 288 K, 288 L, 23/288 M, 288 H, 260, 199, 198, 1 B; 248/2, 17, 18, 358 AA, 146

[56] References Cited

UNITED STATES PATENTS

| | | | |
|---|---|---|---|
| 2,046,478 | 7/1936 | O'Leary | 23/289 X |
| 2,475,109 | 7/1949 | Pendleton | 48/146 |
| 1,869,236 | 7/1932 | Baumann | 165/176 X |
| 1,884,555 | 10/1932 | Brown | 165/176 X |
| 2,256,882 | 9/1941 | Sebald | 165/176 X |

*Primary Examiner*—Joseph Scovronek
*Attorney*—Lyon & Lyon

[57] ABSTRACT

A system of apparatus and process for synthesizing ammonia are disclosed, which includes first and second catalytic synthesis converters with a heat exchanger interposed therebetween and operatively connected to the inlet and outlet of one converter and to the inlet of the other converter to permit a feed gas stream to be passed in heat exchange relationship with a partially synthesized gas stream passing from the outlet of the first converter to the inlet of the second converter. The converters and heat exchanger are mounted on a support platform, with one converter and heat exchanger mounted for movement with respect to the platform to accommodate dimensional changes caused by thermal expansion during operation.

5 Claims, 6 Drawing Figures

INVENTORS.
LEE E. WRIGHT
ALLAN E. PICKFORD
BY Lyon & Lyon
ATTORNEYS

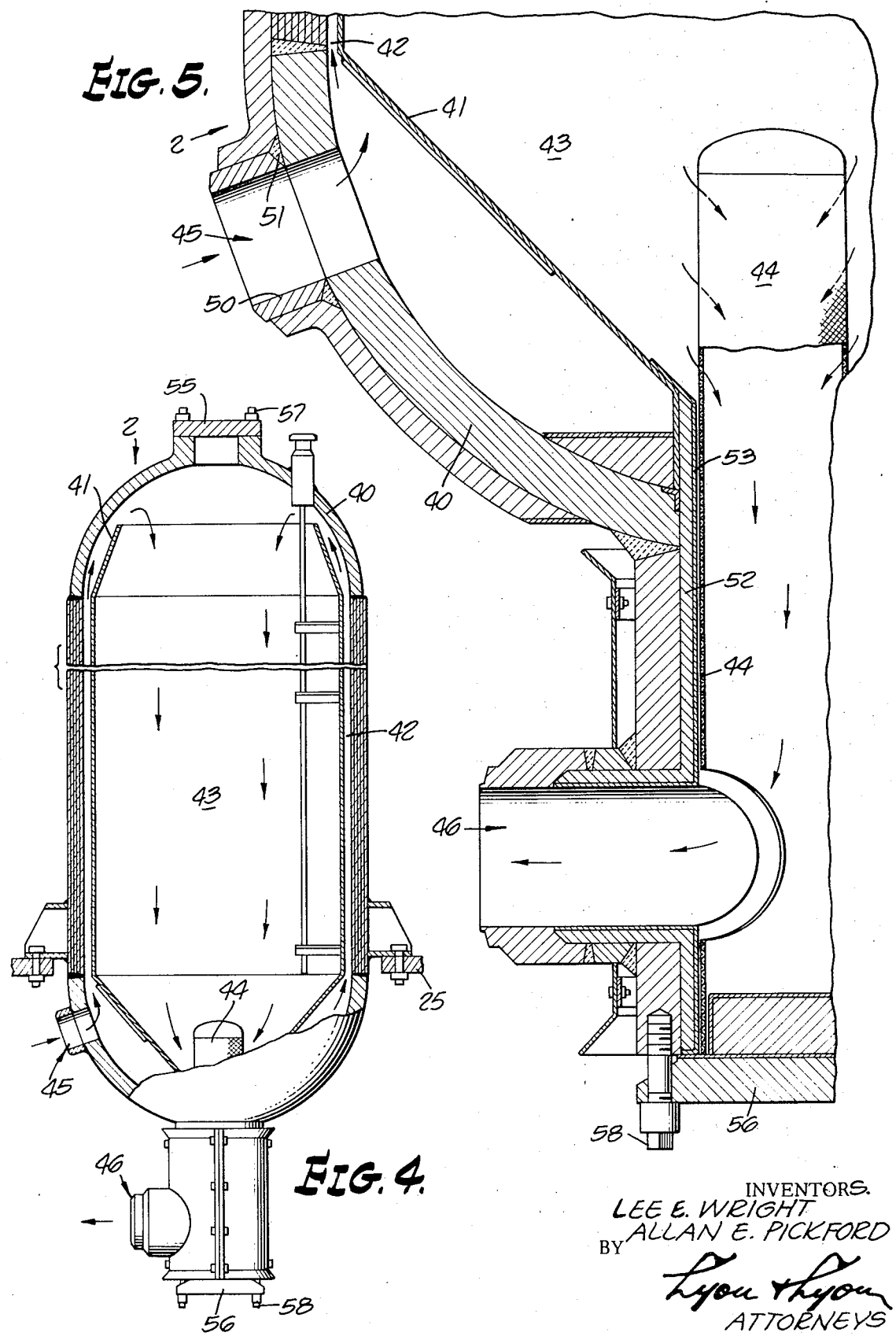

AMMONIA SYNTHESIS SYSTEM

BACKGROUND OF THE INVENTION

This invention relates generally as indicated to the synthesis of ammonia and more particularly to a combination of apparatus and process in which such synthesis can advantageously be carried out.

The production of ammonia from natural gas, such as methane, of course, is well known. Generally, natural gas, water in the form of steam, and air are combined in a series of chemical reactions to produce ammonia of a high degree of purity. The chemical reactions involved in the conventional ammonia process are:

| | |
|---|---|
| Reforming Reaction | $CH_4 + H_2O \rightarrow CO + 3H_2$ |
| Shift Reaction | $CO + H_2O \rightarrow CO_2 + H_2$ |
| Oxidation Reaction | $2H_2 + O_2 \rightarrow 2H_2O$ |
| Ammonia Synthesis | $3H_2 + N_2 \rightarrow 2NH_3$ |

The degree to which these reactions go to completion is generally a function of temperature, pressure and constituents present in the respective reaction. While the reforming reaction is generally conducted at high temperatures and moderate pressure in the presence of a large excess of steam, the ammonia synthesis reaction is conventionally conducted at very high pressures and relatively low to moderate temperatures in order to obtain efficient conversion, inasmuch as the conversion reaction is enhanced by high pressure and low temperature and is greatly retarded by temperatures on the order of about 900°–950° F. This is, of course, particularly significant since the ammonia synthesis reaction is exothermic. Moreover, from a practical standpoint, the synthesis of ammonia is significantly limited not only by the requirement of a reactor capable of withstanding high pressure but also by the necessity for a minimum temperature of at least about 650°–700° F to initiate the reaction, which in turn necessitates careful and accurate control of temperature.

As a result of such limiting factors, a relatively low percentage of conversion is ordinarily obtained in a single pass through conventional reactors. For the process to be economically feasible, however, the unconverted hydrogen and nitrogen must be recovered and subjected to further conversion, but before re-entering the reactor, the temperature must be reduced from about 950°–1,100° F to about 650°–700° F. In some prior systems, this has been accomplished by passing the unconverted gas through one or more chillers and compressors and ultimately recycling to the reactor. This has not resulted in a generally economical and acceptable system, since either an extremely large reactor or a very rapid recycle rate is required to produce sufficient conversion.

In another previously used system, a single reactor is used which includes two somewhat separate reaction zones and temperature reduction means positioned generally between the reaction zones. Such system has practical disadvantages due to the size of reactor required and inadequate and poorly controllable temperature reduction resulting from the heat exchange tubes being positioned adjacent the catalyst bed in which heat, of course, is generated by the exothermic reaction and imparted to the tubes.

SUMMARY OF THE INVENTION

It is a principal object of the present invention therefore to provide a combination of apparatus and the accompanying process for the synthesis of ammonia in which substantially complete conversion may be obtained without encountering the aforenoted disadvantages. In one form, the invention thus comprises a pair of catalytic synthesis converters with a heat exchanger positioned therebetween and connected to the inlet and outlet of one converter and to the inlet of the other converter. The feed gas stream may thus be passed in heat exchange relationship with a partially synthesized gas stream from the first converter. A support platform is also provided with one of the converters fixedly mounted on the platform and the heat exchanger and other converter mounted thereon for movement with respect to the platform to accommodate dimensional changes caused by thermal expansion during operation.

Another object of this invention is the provision of an ammonia synthesis system in which the apparatus is arranged on a support platform in a relatively compact manner to achieve efficient utilization of available plant facilities.

An additional object is the provision of a system in which effective and efficient temperature control is provided.

Yet another object of this invention is the provision of a system for synthesizing ammonia in which efficient use is made of the heat generated during reaction by providing for heat exchange with the reaction product stream.

A further object of this invention is a provision of a system for synthesizing ammonia in which means are included to compensate for thermal expansion during operation.

Other objects, features and advantages of this invention will be apparent to those skilled in the art after a reading of the following more detailed description.

DESCRIPTION OF PREFERRED EMBODIMENTS

In the annexed drawings:

FIG. 4 is an enlarged partial section view of one of the synthesis converters;

FIG. 5 is an enlarged fragmentary view of the lower portion of the converter of FIG. 4.

Figure 1:
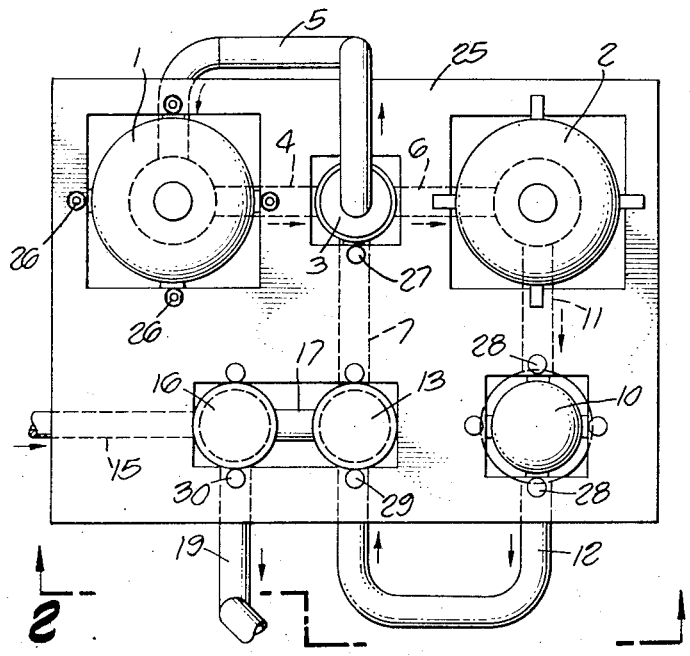
FIG. 1 is a top plan view of the ammonia synthesis system of this invention.
Figure 3:
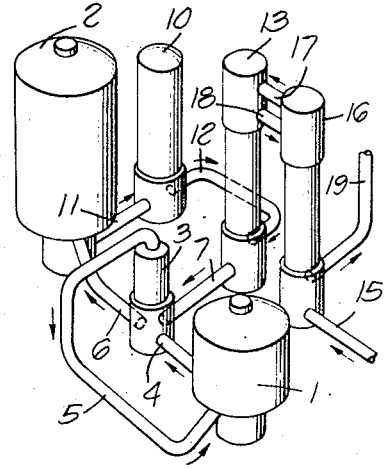
FIG. 3 is a perspective view of the apparatus with the platform omitted for clarity of illustration.
Figure 2:
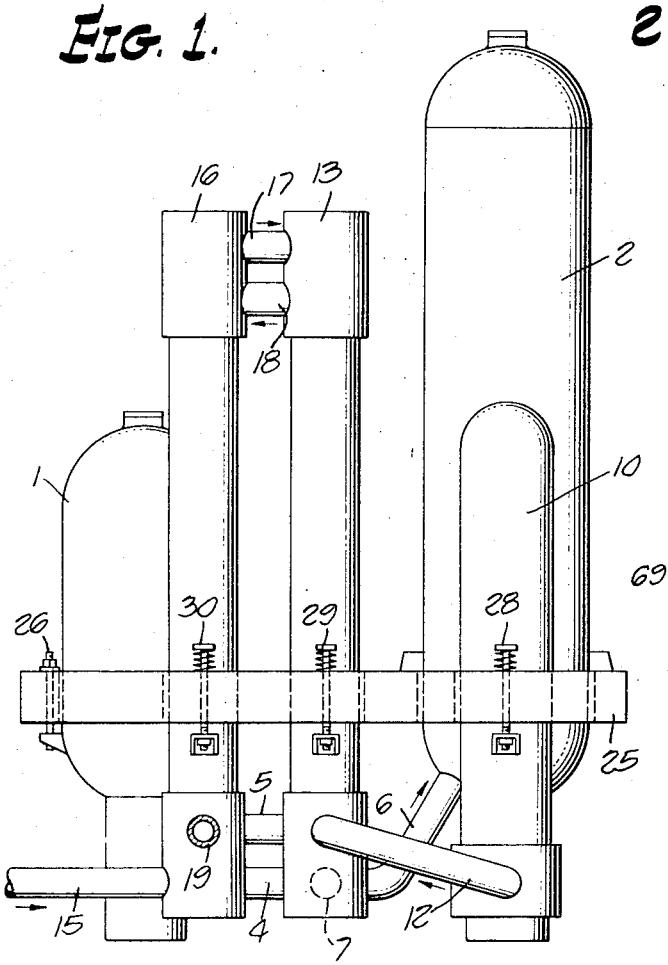
FIG. 2 is a side view of the system taken on line 2—2 of FIG. 1.

Referring now to the drawings and more particularly FIG. 1 through 3 inclusive, the synthesis system includes a pair of generally parallel, upright converters designated by numerals 1 and 2. A heat exchanger 3 is interposed between and operatively connected to each of the converters. As shown perhaps most clearly in FIG. 3, the heat exchanger is connected to converter 1 through pipes 4 and 5. Pipe 6 extends from the lower portion of heat exchanger 3 and connects to the lower portion of converter 2. Pipe 7 is also connected to the lower portion of the heat exchanger and functions as an inlet for the incoming hydrogen and nitrogen which is admitted thereto prior to introduction into converter 1.

In operation, a feed stream containing nitrogen and hydrogen is introduced through pipe 7 into heat exchanger 3 and after heat exchange therein is conveyed through pipe 5 to converter 1. Within converter 1, synthesis of ammonia occurs by reaction under pressure between hydrogen and nitrogen, thereby producing a partially synthesized gas stream which exits from converter 1 through pipe 4 and re-enters heat exchanger 3. Within the heat exchanger, the partially synthesized gas stream is passed in heat exchange relationship with the incoming feed stream (which enters through pipe 7) and exits through pipe 6 through which it is conveyed to converter 2. Within converter 2, the gas stream undergoes further conversion, as will be described more completely hereinafter.

The system also includes a conventional steam generator 10 into which the effluent gas from converter 2 is taken through pipe 11. Within the steam generator, the gaseous ammonia stream is passed in heat exchange relationship with water to produce steam for use in the reforming operation. The use of such a generator is optional insofar as the present system is concerned, but since it is necessary to lower the temperature of the gaseous ammonia for ultimate condensation to a liquid and also since steam is needed for the reforming operation, it is obviously advantageous to utilize in this manner the heat which must be removed from the gaseous ammonia.

After undergoing heat exchange in the steam generator 10, the effluent ammonia gas is taken through pipe 12 to heat exchanger 13. The gas travels upwardly through the heat exchanger in heat exchange relationship in the customary manner with the incoming gas stream which has been introduced through line 15 into heat exchanger 16. The incoming hydrogen and nitrogen gas stream thus passes from heat exchanger 16 into heat exchanger 13 and into heat exchanger 3 through line 7 as previously described. On the other hand, the ammonia gas exits from heat exchanger 13 through line 18 and passes downwardly through heat exchanger 16, whereby its temperature is further lowered, and exits through line 19 for further processing. For purposes of the present invention, such further processing is not illustrated and will not be described in detail since it is conventional in the art, but would include further reduction in temperature by passing through heat exchangers and chillers and eventual condensation and separation as a substantially pure ammonia product, with the unconverted hydrogen and nitrogen being ultimately mixed with fresh feed and recycled to the reactors.

The combination of apparatus is mounted on a platform 25 which may be an 18 inch to 3 foot thick concrete or steel platform, for example, and is thus provided in a relatively compact arrangement for efficient utilization of available facilities. As shown, the converters, heat exchangers and steam generators are all mounted in generally upright position and extend above and beneath platform 25. One of the converters, in the embodiment illustrated, converter 2, is fixidly mounted on the platform, whereas converter 1 is mounted on the platform, as, for example through hanger rods or springs 26 so as to be capable of both lateral and vertical movement with respect to the platform to accommodate dimensional changes caused by thermal expansion during operation. Heat exchanger 3 is likewise mounted on platform 25 by spring means 27 and steam generator 10 and heat exchangers 13 and 16 are mounted by similar spring means 28, 29 and 30 respectively, to permit movement to compensate for expansion and contraction during operation. At least one of the converters should be rigidly or fixedly mounted on the platform to prevent uncontrolled movement of the apparatus and to cause the other apparatus to return to a normal position when the system is not operating.

In FIGS. 4 and 5, the cross section of the catalytic converters is shown in greater detail. The converter there illustrated may be either converter 1 or 2 and simply for the sake of illustration is designated as converter 2. The internal components of the converter, however, are essentially the same, even though as illustrated, converter 2 is preferably considerably taller than converter 1 to provide a greater residence time for the feed stream to undergo reaction, thereby achieving a greater percent of equilibrium conversion to ammonia. The converter includes a shell 40 with a liner 41 positioned therein and spaced from the shell to provide an annular passageway 42 therebetween. Within the liner 41 is a catalyst bed 43 which contains a conventional ammonia synthesis catalyst such as iron or iron in combination with molybdenum or other such substance to increase catalytic activity. An outlet screen 44 is provided adjacent the lower portion of the converter to prevent the solid catalyst particles from exiting with the gas stream. The outlet screen normally will be stainless steel or a nickel based alloy and of a sufficiently small mesh to prevent the catalyst particles from passing therethrough. An inlet 45 is provided adjacent the lower end of the converter through which the hydrogen and nitrogen containing feed stream enters and passes upwardly through passageway 42 and downwardly through catalyst bed 43, and ultimately exits through outlet 46.

As shown more clearly in FIG. 5, the inlet 45 includes a nozzle neck 50 welded at 51 to shell 40. A layer of insulating material 52 such as ceramic felt is provided adjacent outlet screen 44 enclosed by shroud 53 of stainless steel or a nickel base alloy to prevent excessive transfer of heat from the hot gases to the shell of the converter. The converter, of course, includes cover plates 55 and 56 connected by bolts 57 and 58 to its top and bottom respectively.

Figure 6:
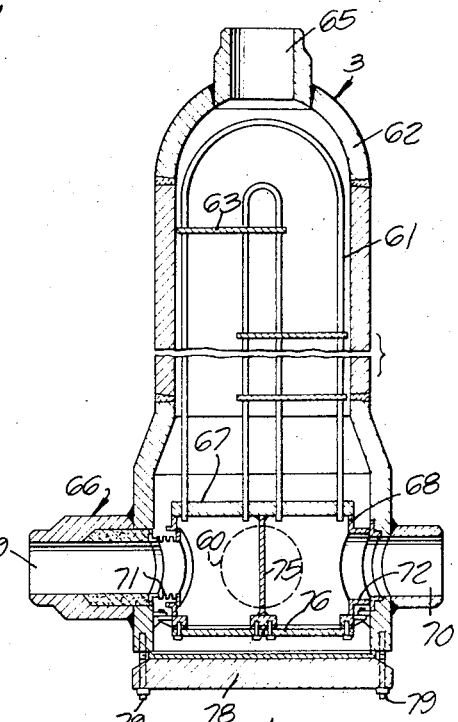
FIG. 6 is an enlarged section view of one of the heat exchangers used in the synthesis system.

Referring now to FIG. 6, the heat exchanger 3 is shown in greater detail. The design of heat exchanger 3 is illustrated and described more completely in the copending application of Allan Pickford, entitled HEAT EXCHANGER and assigned to the assignee of this application, Ser. No. 113,334, filed Feb. 8, 1971, and consequently will be described in somewhat abbreviated manner herein, although its inclusion in the present invention is of considerable importance. The incoming hydrogen and nitrogen feed stream enters the heat exchanger through opening 60 and passes in and around tube bundle 61 which is positioned within the heat exchanger and spaced from shell 62. Although only two tubes are illustrated, the exchanger, of course, includes the usual bundle of tubes. Transverse baffles 63 extend across the interior of the heat exchanger as shown to cause the fluid to travel back and forth across the tube bundle as it passes through the exchanger, thereby providing for more efficient heat exchange. The fluid exits from the heat exchanger through outlet 65 from which it is conveyed through pipe 5 to reactor 1.

The heat exchanger 3 also includes a nozzle assembly 66 attached at its lower portion which supports the tube sheet 67 in which the tube bundle is retained whereby the tube sheet is detached from the shell of the heat exchanger. The tube sheet is mounted on channels 68 which are connected to inlet 69 and outlet 70 of the nozzle assembly through bellows 71 and horizontally extending channel 72 respectively. A partition plate 75 is provided which extends between the tube sheet 67 and plate 76 at the lower portion of the nozzle assembly to prevent fluid entering nozzle 69 from exiting directly through outlet 70 without passing through the tube bundle.

Pipe 4 is connected to inlet nozzle 69 of heat exchanger 3, while pipe 6 is connected to outlet nozzle 70. The fluid passing within the tube bundle is thus the partially synthesized gas stream from reactor 1 which then exits through pipe 6 to reactor 2. A cover plate 78 is also provided at the bottom of the exchanger connected to shell 62 by bolts 79.

In a preferred form, the process of the present invention operates essentially as follows. The hydrogen and nitrogen gas feed stream enters through line 15 to heat exchanger 16 at a temperature of approximately 50° to 200° F and under a pressure of approximately 1,450 to 4,500 psig, in which the temperature of the feed stream is increased to approximately 150° F to about 350° F. The gas feed then passes under a pressure of from about 1,445 to about 4,475 psig to heat exchanger 13 in which the temperature is again increased, to a temperature of about 400° F to about 700° F. The exiting gas will be under a pressure of from approximately 1,440 to about 4,450 psig and will be taken through line 7 to heat exchanger 3. The temperature of the hydrogen and nitrogen feed stream will be increased within heat exchanger 3 to at least about 650° to 700° F, which temperature is necessary to initiate reaction between hydrogen and nitrogen to produce ammonia. As mentioned previously, the temperature of the feed stream entering converter 1 will be maintained no greater than about 800° F., as the conversion reaction under equilibrium conditions is not favored by higher temperature. The pressure of the incoming gas stream to reactor 1 will be from about 1,410 to about 4,425 psig. Within reactor 1, the temperature of the gas stream increases since the conversion reaction is exothermic. The temperature of the product gas which passes from reactor 1 through pipe 4 to heat exchanger 3 will be on the order of about 800° to 1,100° F and at a pressure of about 1,385 to about 4,410 psig. Within the heat exchanger 3, the temperature is lowered as previously described so that the temperature of the gas stream in line 6 prior to entering reactor 2 will be on the order of from about 650° to about 800° F. The pressure will be about 1,350 to about 4,385 psig.

Within reactor 2, further reaction of the unconverted hydrogen and ammonia occurs. In reactor 1, normally about 30 to about 90 mole percent, based on the percent of hydrogen in the fresh feed, of the incoming hydrogen and nitrogen is converted with from about 70 to about 10 mole percent occurring in reactor 2. Since the reaction between hydrogen and nitrogen in reactor 2 is also exothermic, the temperature of the gas increases to around 700° to about 1,000° F. The pressure is from about 1,320 to about 4,365 psig.

In steam generator 10, the temperature of the gas is reduced as explained previously to a temperature on the order of about 600° to about 660° F. The pressure of the gas exiting from the steam generator is normally from about 1,260 to about 4,340 psig. After passing through heat exchangers 13 and 16, the temperature of the ammonia gas has been reduced to about 120° to about 250° F, and the pressure is about 1,250 to about 4,325 psig.

It will be appreciated from the foregoing description that the present invention provides a system for synthesizing ammonia in which the temperature can be properly controlled to insure efficient reaction. By the same token, the present invention provides a relatively simple and compact arrangement of apparatus and compensates for thermal movement and thus represents a significant improvement over previously known conventional systems.

We claim:

1. A system of apparatus for synthesizing ammonia from a mixture of nitrogen and hydrogen in a feed gas stream, comprising in combination: first and second parallel upright synthesis converters, each having an inlet and outlet and each containing a catalyst bed operatively positioned between the inlet and the outlet, an upright elongated heat exchanger physically positioned between said converters, means including a pipe for delivering a feed gas stream to said heat exchanger, piping connecting said heat exchanger to the inlet and outlet of the first of said converters and to the inlet of said second converter, whereby the feed gas stream may be passed in heat exchange relationship with a partially synthesized gas stream passing from the outlet of said first converter to the inlet of said second converter, a support platform, means fixedly supporting said second converter on said platform to prevent uncontrolled movement of such system of apparatus, and means mounting said heat exchanger and said first converter on said platform for lateral and vertical movement with respect thereto, to accommodate dimensional changes occasioned by thermal expansion of said piping.

2. The apparatus of claim 1 in which means are provided for heat exchanging effluent gas from the outlet of said second converter with feed gas upstream from said pipe, the latter said means including a second and third upright heat exchanger mounted on said platform for thermal expansion movement with respect thereto.

3. A system of apparatus for synthesizing ammonia from a mixture of nitrogen and hydrogen in a feed gas stream, comprising in combination: first and second parallel upright synthesis converters each having an inlet and an outlet and each containing a catalyst bed operatively positioned between the inlet and the outlet, an upright elongated heat exchanger physically positioned between said converters, means including a first pipe for delivering a feed gas stream to said heat exchanger, second, third and fourth pipes connecting said heat exchanger to the inlet and outlet of the first of said converters and to the inlet of said second converter respectively, whereby a feed gas stream may be passed in heat exchange relationship with a partially synthesized gas stream passing from the outlet of said first converter to the inlet of said second converter, a support platform, said heat exchanger and converters extending both above and beneath said platform, means fixedly supporting said second converter on said platform to prevent uncontrolled movement of such system of apparatus, and means suspending said heat exchanger and said first converter from said platform for lateral and vertical movement with respect thereto, to accommodate dimensional changes occasioned by thermal expansion of said pipes.

4. The apparatus of claim 3 in which means are provided for heat exchanging effluent gas from the outlet of said second converter with feed gas upstream from said first pipe, the latter said means including second and third upright heat exchangers suspended from said platform for thermal expansion movement with respect thereto.

5. The system of apparatus of claim 1 in which said heat exchanger includes an outlet connected to said first converter and a nozzle assembly at the lower end thereof, said nozzle assembly including a first inlet nozzle communicating with said pipe means for the delivery of feed gas to said heat exchanger, whereby feed gas may be passed through said heat exchanger and said outlet of said heat exchanger to said first converter, a second inlet nozzle communicating with said first converter, and an outlet nozzle connected to said second converter, thus permitting partially synthesized gas from said first converter to pass through said heat exchanger and to said second converter.

* * * * *

UNITED STATES PATENT AND TRADEMARK OFFICE
Certificate

Patent No. 3,721,532            Patented March 20, 1973

Lee E. Wright and Allan E. Pickford

Application having been made by Lee E. Wright and Allan E. Pickford, the inventors named in the patent above identified, and C. F. Braun & Company, Alhambra, California, a corporation of California, the assignee, for the issuance of a certificate under the provisions of Title 35, Section 256, of the United States Code, adding the name of Wayne A. Glover as a joint inventor, and a showing and proof of facts satisfying the requirements of the said section having been submitted, it is this 3rd day of May 1977, certified that the name of the said Wayne A. Glover is hereby added to the said patent as a joint inventor with the said Lee E. Wright and Allan E. Pickford.

FRED W. SHERLING,
*Associate Solicitor.*